(12) United States Patent
Koide et al.

(10) Patent No.: US 6,273,708 B1
(45) Date of Patent: Aug. 14, 2001

(54) MOTOR-DRIVEN-TYPE INJECTION MOLDING MACHINE

(75) Inventors: Atsushi Koide; Koichi Matubayashi, both of Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 09/421,696

(22) Filed: Oct. 20, 1999

(30) Foreign Application Priority Data

Oct. 20, 1998 (JP) .................................................. 10-298082

(51) Int. Cl.$^7$ .................................................. B29C 45/64
(52) U.S. Cl. .............................................................. 425/589
(58) Field of Search ................................. 425/589, 590, 425/595

(56) References Cited

U.S. PATENT DOCUMENTS

| | | | |
|---|---|---|---|
| 4,540,359 | * | 9/1985 | Yamazaki ............................. 425/589 |
| 4,865,536 | * | 9/1989 | Inaba et al. .......................... 425/589 |
| 4,988,273 | * | 1/1991 | Faig et al. ............................ 425/589 |
| 5,362,222 | * | 11/1994 | Faig et al. ............................ 425/589 |

FOREIGN PATENT DOCUMENTS 9-11290   1/1997 (JP) .

\* cited by examiner

*Primary Examiner*—Tim Heitbrink
(74) *Attorney, Agent, or Firm*—Birch, Stewart, Kolasch & Birch, LLP

(57) ABSTRACT

In a motor-driven-type injection molding machine, large-sized motors (a motor for screw rotation, a motor for screw reciprocation, and a motor for mold clamping) are accommodated in an interior space of a machine base to be located substantially at the center of the machine base with respect to the transverse direction thereof; and each of rotation-transmitted portions provided in an injection apparatus and a mold clamping apparatus is drivingly connected to the corresponding motor via a rotation transmission mechanism comprising a rotation transmission belt. Since the large, heavy motors are accommodated within the interior space of the machine base to be located substantially at the center of the machine base with respect to the transverse direction thereof, the height of the overall center of gravity of the molding machine is lowered, weight balance is improved, and the degree of quietness is improved. In addition, the servomotors can be connected directly to a control unit disposed within the interior space of the machine base, without connection cords being routed to the outside of the machine base.

10 Claims, 5 Drawing Sheets

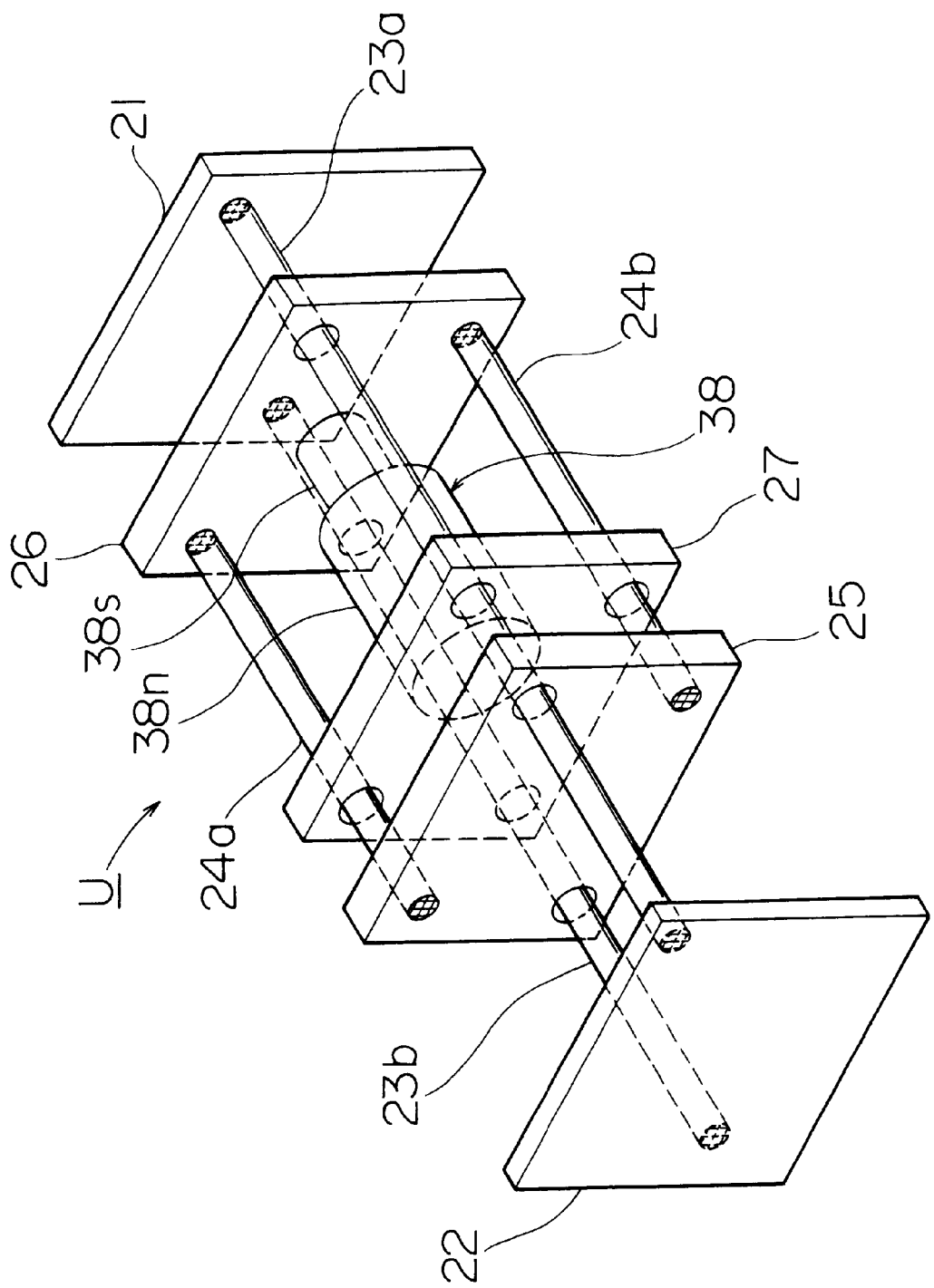

MOTOR-DRIVEN-TYPE INJECTION MOLDING MACHINE

BACKGROUND OF THE INVENTION

1. Field of the Invention

The present invention relates to a motor-driven-type injection molding machine in which an injection apparatus and a mold clamping apparatus are disposed on the upper surface of a machine base.

2. Description of the Related Art

Conventionally, a motor-driven-type injection molding machine in which servomotors are used as drive sources has been known (see, for example, Japanese Patent Application Laid-Open (kokai) No. 9(1997)-11290.

Such a motor-driven-type injection molding machine comprises a screw reciprocation drive section and a screw rotation drive section. In the screw reciprocation drive section, a servomotor for screw reciprocation is attached to a motor attachment member disposed on the upper surface of a machine base; a screw portion of a ball-screw mechanism connected to a motor shaft of the servomotor is screw-engaged with a nut portion provided on a slider which is supported to be movable in the front/rear direction; and a screw is rotatably supported at the front end of the slider. Thus, the screw is advanced and retracted upon rotation of the servomotor for screw reciprocation. In the screw rotation drive section, a servomotor for screw rotation is attached to the slider; and a driver gear attached to a motor shaft of the servomotor is meshed with a driven gear provided on a shaft portion of the screw. Thus, the screw is rotated upon rotation of the servomotor for screw rotation.

The above-described conventional motor-driven-type injection molding machine has the following drawbacks to be solved.

First, since the servomotors must be disposed in the vicinity of the respective portions to which rotation is transmitted (hereinafter referred to as "rotation-transmitted portions"), the servomotors—which are heavy and large in size—care disposed at upper and side portions of the molding machine. Therefore, the molding machine suffers a weight imbalance (i.e., is topheavy), so that transportation and installation of the molding machine cannot be performed in a stable manner.

Second, the servomotors are disposed at a position close to an operator area in an exposed state, and means for insulating motor noise is not provided. Therefore, the operator is exposed to excessive motor noise, so that the molding machine is unsatisfactory in terms of quietness.

Third, since a control unit for the servomotors is typically accommodated within the machine base, connection cords for connecting the control unit and the servomotors become long and are exposed to the outside, resulting in occurrence of various problems such as a problem of an object becoming entangled in the connection cords.

SUMMARY OF THE INVENTION

An object of the present invention is to provide a motor-driven-type injection molding machine having a lowered center of gravity and improved weight balance in order to secure stability during transportation, installation, and other operations.

Another object of the present invention is to provide a motor-driven-type injection molding machine which has an improved degree of quietness in order to improve the working environment.

Still another object of the present invention is to provide a motor-driven-type injection molding machine which can solve various problems which could otherwise occur due to exposed connection cords.

To achieve the above objects, the present invention provides a motor-driven-type injection molding machine comprising an injection apparatus and a mold clamping apparatus disposed on the upper surface of a machine base, wherein large-sized motors (a motor for screw rotation, a motor for screw reciprocation, and a motor for mold clamping) are accommodated in an interior space of the machine base to be located substantially at the center of the machine base with respect to the transverse direction thereof; and each of rotation-transmitted portions provided in the injection apparatus and the mold clamping apparatus is drivingly connected to the corresponding motor via a rotation transmission mechanism comprising a rotation transmission belt.

In the motor-driven-type injection molding machine according to the present invention, the large, heavy motors are accommodated within the interior space of the machine base to be located substantially at the center of the machine base with respect to the transverse direction thereof. Therefore, the height of the overall center of gravity of the molding machine is lowered, weight balance is improved, and the degree of quietness is improved. In addition, the servomotors can be connected directly to a control unit disposed within the interior space of the machine base, without connection cords being routed to the outside of the machine base.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a schematic view showing the principle of an injection apparatus support mechanism of the motor-driven-type injection molding machine shown in FIG. 1.

DETAILED DESCRIPTION OF THE PREFERRED EMBODIMENT

Figure 1:
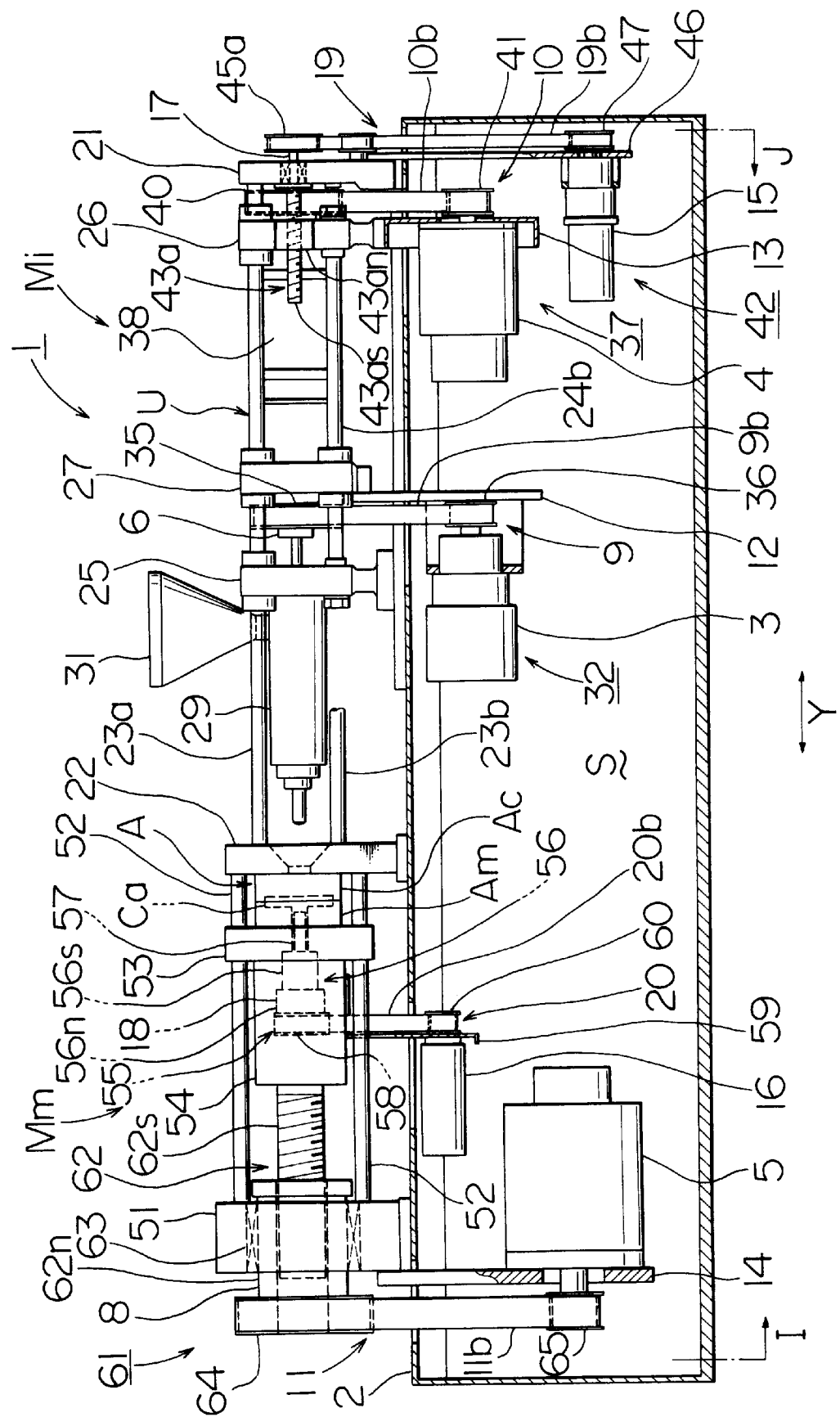
FIG. 1 is a partially sectioned side view of a motor-driven-type injection molding machine according to an embodiment of the present invention.

An embodiment of the present invention will now be described in detail with reference to the drawings (FIGS. 1 to 5). The accompanying drawings are illustrative of the embodiments and are not meant to limit the scope of the invention. For clarification of the invention, detailed description of known parts is omitted.

A motor-driven-type injection molding machine 1 according to the present embodiment has a machine base 2 having a box-like shape. A mold clamping apparatus Mm is disposed directly on the upper surface of the machine base 2, and an injection machine Mi is disposed on the upper surface of the machine base 2 via an injection apparatus support mechanism U.

The injection apparatus support mechanism U has a back plate 21 which stands upright and is fixed onto the upper surface of the base 2 at one end portion thereof, and a mold attachment plate 22 which stands upright and is fixed onto the upper surface of the base 2 at an intermediate portion thereof. Therefore, the mold attachment plate 22 and the back plate 21 face each other. Further, paired main tie-bars 23a and 23b are disposed to extend between the mold attachment plate 22 and the back plate 21. The main tie-bars 23a and 23b support a front support plate 25 and a rear support plate 26, which are connected to each other by means of paired auxiliary tie-bars 24a and 24b, such that the front and rear support plates 25 and 26 can slide along the main tie-bars 23a and 23b. Moreover, the main tie-bars 23a and 23b and the auxiliary tie-bars 24a and 24b support an intermediate support block 27 such that the intermediate support block 27 can slide along the main tie-bars 23a and 23b and the auxiliary tie-bars 24a and 24b. Thus, the injection apparatus support mechanism U is constructed, and the injection apparatus Mi is supported by the injection apparatus support mechanism U.

The structure of the injection apparatus support mechanism U is shown in FIG. 5, which schematically shows the principle thereof. The mold attachment plate 22, the back plate 21, the front support plate 25, the rear support plate 26, and the intermediate support block 27 each have a rectangular shape as viewed from the front. The main tie-bars 23a and 23b are disposed at symmetrical positions with respect to a screw 28, which will be described later, such that the main tie-bar 23a and 23b are located at opposite ends of one diagonal of each of the plates 21, 22, etc.; more specifically, at the upper-right corner and the lower-left corner of each of the plates 21, 22, etc., as viewed from the front (the side where the mold attachment plate 22 is present). Meanwhile, the auxiliary tie-bars 24a and 24b are disposed at symmetrical positions with respect to the screw 28 such that auxiliary tie-bars 24a and 24b are located at opposite ends of the other diagonal of each of the plates 21, 22, etc.; more specifically, at the upper-left corner and the lower-right corner of each of the plates 21, 22, etc., as viewed from the front.

The rear end of a heating barrel 29 is attached to the front support plate 25. An injection nozzle 30 is provided at the tip end of the barrel 29, and a hopper 31 is provided at a rear portion of the barrel 29 to be located on the upper side of the barrel 29. The screw 28 is inserted into the interior of the barrel 29.

Figure 2:
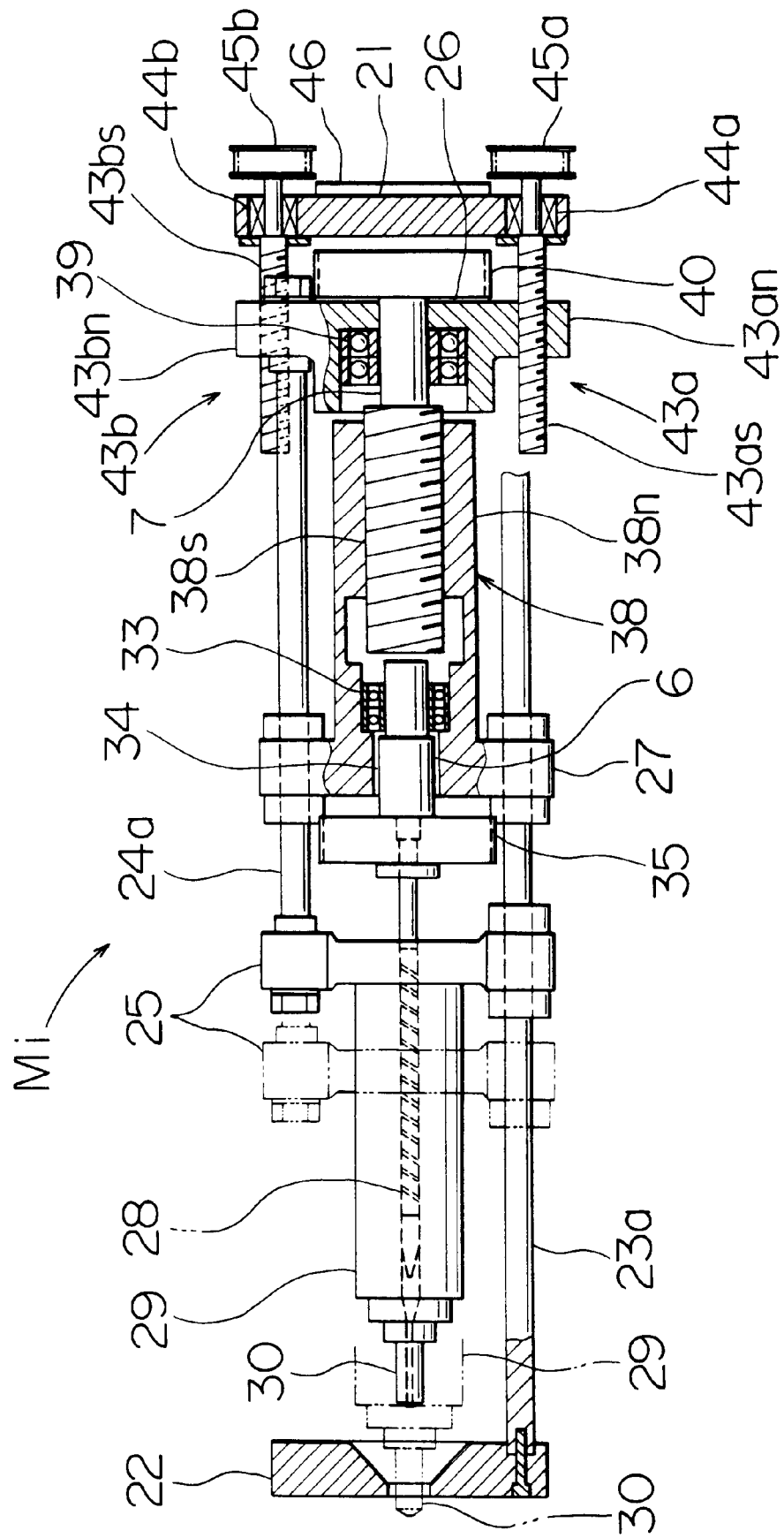
FIG. 2 is a partially sectioned plane view of an injection apparatus of the motor-driven-type injection molding machine shown in FIG. 1.

On the intermediate support block 27 is provided a screw rotation drive section 32 for rotating the screw 28 inserted into the barrel 29. As shown in FIG. 2, the intermediate support block 27 extends in the front/rear direction. A rotation shaft 34 (a rotation-transmitted portion 6) is rotatably supported by a front portion of the intermediate support block 27 via a bearing 33. The rotation shaft 34 is disposed coaxialy with the screw 28, and a front portion of the rotation shaft 34 projects frontward from the intermediate support block 27. Further, a driven pulley 35 is attached to the projected front portion of the rotation shaft 34, and the rear end of the screw 28 is coupled to the front end of the projected front portion. Moreover, the upper end of a motor support member 12 is fixed to the front end of the intermediate support block 27 (a section having the rotation-transmitted portion 6), and the lower portion of the motor support member 12 is extended to the interior space S of the machine base 2. A servomotor 3 for screw rotation is attached to the lower portion of the motor support member 12 accommodated in the interior space S, and a drive pulley 36 is attached to a motor shaft of the servomotor 3. Further, an endless timing belt (a rotation transmission belt) 9b is wound around and extended between the drive pulley 36 and the driven pulley 35 to complete the screw rotation drive section 32. In this case, the driven pulley 35, the drive pulley 36, and the endless timing belt 9b constitute a rotation transmission mechanism 9.

In a measurement step, the screw rotation drive section 32 is driven and controlled, so that a molding material supplied from the hopper 31 to the interior of the barrel 29 is plasticized (melted). In this case, upon operation of the servomotor 3 for screw rotation, the screw 28 is rotated to perform measurement. At this time, the screw 28 and the intermediate support block 27 are retracted through back-pressure control of a screw reciprocation drive section 37, which will be described later. The back pressure is controlled on the basis of pressure detected by means of a load cell (pressure sensor) attached to the bearing 33.

The screw reciprocation drive section 37 for advancing and retracting the screw rotation drive section 32 is provided on the rear support plate 26. The rear support plate 26 rotatably supports a shaft portion (a rotation-transmitted portion 7) of a screw portion 38s of a ball-screw mechanism 38 via bearings 39. A rear portion of the shaft portion is projected rearward from the rear support plate 26, and a driven pulley 40 is attached to the projected rear portion. Further, the screw portion 38a—which projects forward from the rear support plate 26—is in screw-engagement with a nut portion 38n integrally provided at a rear portion of the intermediate support block 27. Moreover, the upper end of a motor support member 13 is fixed to the lower end of the rear support plate 26 (a section having the rotation transmitted portion 7), and the lower portion of the motor support member 13 is extended to the interior space S of the machine base 2. A servomotor 4 for screw reciprocation is attached to the lower portion of the motor support member 13 accommodated in the interior space S, and a drive pulley 41 is attached to a motor shaft of the servomotor 4. Further, an endless timing belt (a rotation transmission belt) 10b is wound around and extended between the drive pulley 41 and the driven pulley 40 to complete the screw reciprocation drive section 37. In this case, the driven pulley 40, the drive pulley 41, and the endless timing belt 10b constitute a rotation transmission mechanism 10. Thus is constructed the injection apparatus Mi supported by the front support plate 25, the intermediate support block 27, and the rear support plate 26.

In an injection step, the screw reciprocation drive section 37 is driven and controlled such that the measured resin is injected and charged into a mold cavity Ca (see FIG. 1). In this case, upon operation of the servomotor 4 for screw reciprocation, the screw portion 38s of the ball-screw mechanism 38 rotates, so that the intermediate support block 27, on which the nut portion 38n is integrally formed, and the screw 28 advance at a preset injection speed.

An injection-apparatus reciprocation drive section 42 for advancing and retracting the rear support plate 26 is provided on the back plate 21. The injection-apparatus reciprocation drive section 42 comprises paired left and right ball-screw mechanisms 43a and 432b (a rotation-transmitted portion 17) disposed to extend between the back plate 21 and the rear support plate 26, and a servomotor 15 for injection apparatus reciprocation, which rotates and drives the ball-screw mechanisms 43a and 43b. In the present embodiment, the ball-screw mechanisms 43a and 43b are disposed symmetrically with respect to the screw 28 (the injection nozzle 30). The shaft portions of the screw portions 43as and 43bs of the ball-screw mechanism 43a and 43b are rotatably supported via bearings 44a and 44b provided at the left and right ends of the back plate 21, and rear portions of the respective shaft portions are projected rearward from the back plate 21, and driven pulleys 45a and 45b are attached to the projected rear portions. Further, the screw portions 43as and 43bs—which project forward from the back plate 21—are in screw-engagement with nut portions 43an and 43bn, which are integrally provided at left and right ends of the rear support plate 26. Moreover, the upper end of a motor support member 46 is fixed to the back face of the back plate 21 (a section having the rotation-transmitted portion 17), and as shown in FIG. 1, the lower portion of the motor support member 46 is extended to the interior space S of the machine base 2. A servomotor 15 is attached to the lower portion of the motor support member 46 accommodated in the interior space S, and a drive pulley 47 is attached to a motor shaft of the servomotor 15. Further, an endless timing belt (a rotation transmission belt) 19b is wound around and extended between the drive pulley 47 and the driven pulley 45a and 45b to complete the injection-apparatus reciprocation drive section 42. In this case, the driven pulleys 44a and 45b, the drive pulley 47, and the endless timing belt 19b constitute a rotation transmission mechanism 19. Reference numerals 48a and 48b denote rotatable idler pulleys which are attached to the motor support member 46 and are in contact with the outer surface of the timing belt 19b in order to guide the belt 19b.

By virtue of the above-described structure, through drive and control of the injection-apparatus reciprocation drive section 42, nozzle touch and nozzle release operations can be performed. In these operations, since the screw portions 43as and 43bs of the ball-screw mechanisms 43a and 43b are rotated upon operation of the servomotor 15, the rear support plate 26 integrated with the nut portions 43an and 43bn advances and retracts along the axis of screw 28. Since the front and rear support plates 25 and 26 are integrally attached to each other via the auxiliary tie-bars 24a and 24b, the entirety of the injection apparatus Mi supported by the injection apparatus support mechanism U advances and retracts accordingly. When the injection apparatus Mi advances, the injection nozzle 30 advances to a position indicated by a phantom line in FIG. 2 and touches a stationary mold Ac attached to the mold attachment plate 22, thereby enabling injection and charge of melted resin into the mold cavity Ca. When the injection apparatus Mi retracts, the injection nozzle 30 is released from the stationary mold.

Figure 3:
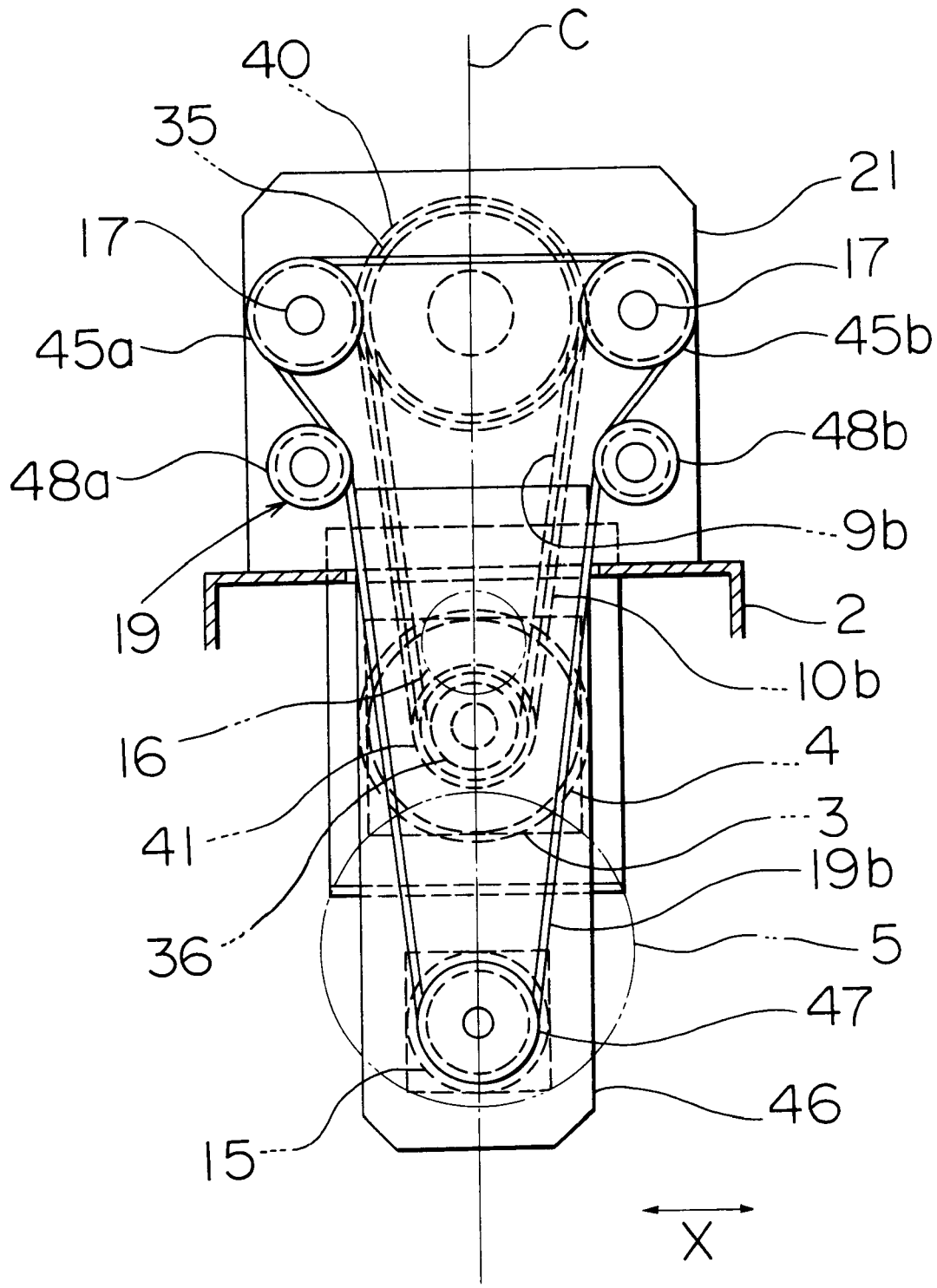
FIG. 3 is a cross-sectional view taken along line J in FIG. 1 and as viewed from the rear.

As described above, on the side of the injection apparatus Mi, the motor (large motor) 3 for screw rotation, the motor (large motor) 4 for screw reciprocation, and the motor (small motor) 15 for injection apparatus reciprocation are accommodated in the interior space S of the machine base 2 such that, as shown in FIG. 3, these motors 3, 4 and 15 are located at the center of the machine base 2 in the transverse direction X of the machine base 2; i.e., on a center line c shown in FIG. 3.

Next, the mold clamping apparatus Mm will be described. A pressure receiving plate 51 standing upright is fixed onto the other end of the upper surface of the machine base 2, and four tie-bars 52 are disposed to extend between the pressure receiving plate 51 and the mold attachment plate 22. The tie-bars 52 slidably support a movable plate 53, to which a movable mold Am is attached. The movable mold Am and the stationary mold Ac constitute a mold A having the mold cavity Ca.

An ejector block 54 is attached to the back face of the movable plate 53, and an ejector drive section 55 is accommodated within the ejector block 54. The ejector drive section 55 comprises a screw portion 56s and a nut portion 56n (a rotation-transmitted portion 18), which constitute a ball-screw mechanism 56; an ejector pin 57 facing the mold cavity Ca; and a driven pulley 58 attached to the nut portion 56n. Further, the upper end of a motor support member 59 is fixed to the ejector block 54 (a section having the rotation-transmitted portion 18), and the lower portion of the motor support member 59 is extended to the interior space S of the machine base 2. A servomotor 16 for ejection is attached to the lower portion of the motor support member 59 accommodated in the interior space S, and a drive pulley 60 is attached to a motor shaft of the servomotor 16. Further, an endless timing belt (a rotation transmission belt) 20b is wound around and extended between the drive pulley 60 and the driven pulley 58. The driven pulley 58, the drive pulley 60, and the endless timing belt 20b constitute a rotation transmission mechanism 20.

In an ejection step, the ejector drive section 55 is driven and controlled such that a molded product is ejected from the mold cavity Ca. In this case, upon operation of the servomotor 16 for ejection, the nut portion 56n of the ball-screw mechanism 56 is rotated, so that the screw portion 56s and the ejector pin 57 integrally attached to the screw portion 56s advance or retract accordingly.

Meanwhile, a movable plate reciprocation drive section 61 for advancing and retracting the movable plate 53 is provided on the pressure receiving plate 51. The pressure receiving plate 51 rotatably supports a nut portion 62n (a rotation-transmitted portion 8) of a ball-screw mechanism 62 via a bearing 63, and a driven pulley 64 is attached to the end of the nut portion 62n. In this case, the nut portion 62n has a cylindrical shape such that the front and rear ends of the nut portion 62n are opened. A screw portion 62s in screw-engagement with the nut portion 62n is extended toward the movable plate 53, and the tip end of the screw portion 62s is coupled to the ejector block 54. Further, the upper end of a motor support member 14 is fixed to the pressure receiving plate 51 (a section having the rotation-transmitted portion 8), and the lower portion of the motor support member 14 is extended to the interior space S of the machine base 2. A servomotor 5 for molding clamping is attached to the lower portion of the motor support member 14 accommodated in the interior space S, and a drive pulley 65 is attached to a motor shaft of the servomotor 5. Further, an endless timing belt (a rotation transmission belt) 11b is wound around and extended between the drive pulley 65 and the driven pulley 64 to complete the movable plate reciprocation drive section 61. In this case, the driven pulley 64, the drive pulley 65, and the endless timing belt 11b constitute a rotation transmission mechanism 11.

In a mold clamping step, the movable plate reciprocation drive section 61 is driven and controlled, so that an operation for opening and closing the mold A and an operation for molding clamping are performed. In this case, upon operation of the servomotor 5 for mold clamping, the nut portion 62n of the ball-screw mechanism 62 rotates, so that the screw portion 62s advances and retracts accordingly. As a result, the movable plate 53 advances and retracts along the tie-bars 52 for opening and closing the mold A as well as for clamping the mold A.

Figure 4:
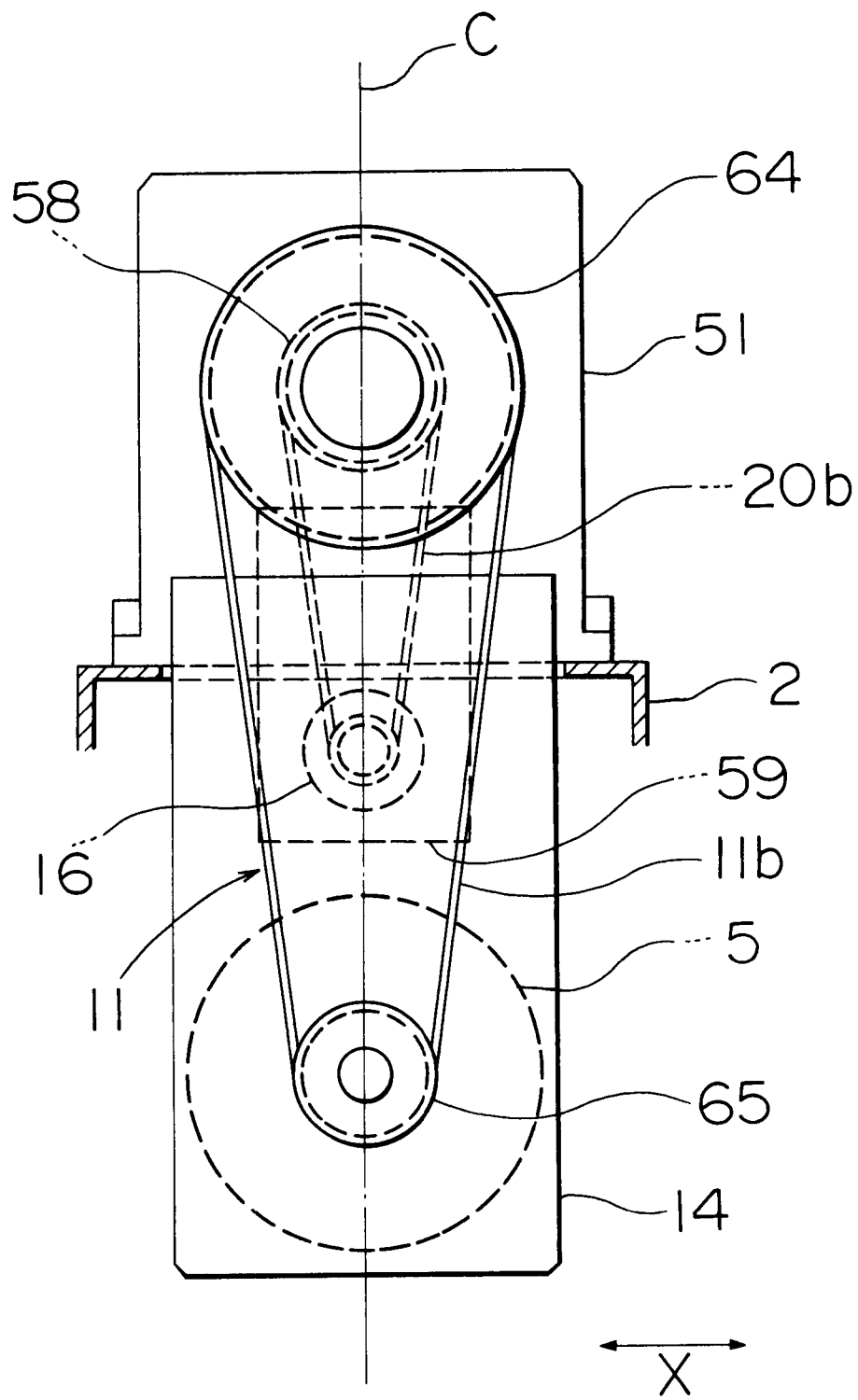
FIG. 4 is a cross-sectional view taken along line I in FIG. 1 and as viewed from the front.

As described above, on the side of the mold clamping apparatus Mm, the motor (large motor) 5 for mold clamping and the motor (small motor) 16 for ejection are accommodated in the interior space S of the machine base 2 such that, as shown in FIG. 4, these motors 5 and 16 are located at the center of the machine base with respect to the transverse direction X of the machine base 2; i.e., on a center line c shown in FIG. 4. Therefore, in the motor-driven-type injection molding machine 1 according to the present embodiment, as shown in FIG. 1, all of the major motors 3, 4, 5, 15, and 16 are accommodated in the interior space S of the machine base 2, and as shown in FIGS. 3 and 4, the motors 3, 4, 5, 15, and 16 are disposed at the center with respect to the transverse direction X of the machine base 2. In addition, as shown in FIG. 1, the servomotor 4 for screw reciprocation and the servomotor 5 for mold clamping are disposed at opposite ends of the machine base 2 with respect to the longitudinal (front/rear) direction Y such that they are oriented to face opposite directions, and the motor 3 for screw rotation is disposed between the servomotor 4 for screw reciprocation and the servomotor 5 for mold clamping. Therefore, the height of the overall center of gravity of the molding machine is lowered and weight balance is improved, so that transportation, installation, and other operations can be performed in a stable manner. In addition, the resultantly enhanced noise insulation performance improves the degree of quietness. Moreover, the servomotors can be connected directly to a control unit disposed within the interior space S of the machine base 2, without connection cords being routed to the outside of the machine base. Therefore, there can be solved various problems, which could otherwise occur due to exposed connection cords, such as the problems of the connection cords becoming longer, an object becoming entangled in the connection cords, deteriorated maintainability, breakage or cutting of a connection cord, and deteriorated appearance (value as merchandise).

Since the mold attachment plate 22 and the back plate 21 are supported by the paired main tie-bars 23a and 23b disposed symmetrically with respect to the screw 28, a sufficient level of mechanical strength (fixation strength) is secured for the mold attachment plate 22 and the back plate 21. In addition, since the front support plate 25 and the rear support plate 26 are connected to each other by the paired auxiliary tie-bars 24a and 24b disposed symmetrically with respect to the screw 28 at positions different from those of the main tie-bars 23a and 23b, the mechanical strength of these plates is secured. Accordingly, inclination of the mold attachment plate 22 and the injection apparatus Mi—which is a problem involved in conventional injection molding machines—is prevented, so that the durability of the entire injection apparatus Mi is improved, and occurrence of a malfunction is prevented.

Since the main tie-bars 23a and 23b support (guide) the front and rear support plates 25 and 26, the main tie-bars 23a and 23b provide a support function and a guide function for the front and rear support plates 25 and 26. In addition, since the main tie-bars 23a and 23b and the auxiliary tie-bars 24a and 24b support (guide) the intermediate support block 27, the main tie-bars 23a and 23b and the auxiliary tie-bars 24a and 24b provide a support function and a guide function for the intermediate support block 27. As described, since each of the main tie-bars 23a and 23b and the auxiliary tie-bars 24a and 24b provides a plurality of functions, costs can be reduced.

The injection-apparatus reciprocation drive section 42 is provided on the back plate 21; comprises the paired ball-screw mechanisms 43a and 43b disposed symmetrically with respect to the screw 28, as well as the servomotor 15 for rotating the ball-screw mechanisms 43a and 43b; and is adapted to advance and retract the rear support plate 26. Therefore, a reaction force generated during nozzle touch operation acts on the back plate 21 in a direction perpendicular thereto, so that no excessive stresses act on the mold attachment plate 22 and the injection apparatus. Accordingly, there can be eliminate an additional cost, which would otherwise be required to secure sufficient mechanical strength of a mechanism for fixing or supporting the mold attachment plate 22 and the injection apparatus.

The present invention is not limited to the above-described embodiments. Regarding structural details, shape, material, number of elements, arrangement, and the like, modifications and any omission or addition may be possible as needed without departing from the scope of the invention. For example, in the embodiment, the motor 15 for injection apparatus reciprocation and the motor 16 for ejection are accommodated in the interior space S of the machine base 2. However, these small motors are not necessarily required to be accommodated in the interior space S of the machine base 2. Further, motors other than those illustrated as examples may be accommodated in the interior space S in a similar manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor-driven injection molding machine comprising:
an injection apparatus and a mold clamping apparatus disposed on an upper surface of a machine base, wherein large-sized motors are accommodated in an interior space of said machine base to be located substantially at a center of said machine base with respect to a transverse direction thereof; and each of rotation-transmitted portions provided in said injection apparatus and said mold clamping apparatus is drivingly connected to said corresponding large-sized motor via a rotation transmission mechanism comprising a rotation transmission belt.

2. A motor-driven injection molding machine according to claim 1, wherein said large-sized motors include a motor for screw rotation, a motor for screw reciprocation, and a motor for mold clamping.

3. A motor-driven injection molding machine according to claim 2, wherein said motor for screw reciprocation and said motor for mold clamping are disposed at longitudinal opposite ends of said machine base; and said motor for screw rotation is disposed between said motor for screw reciprocation and said motor for mold clamping.

4. A motor-driven injection molding machine according to claim 1, wherein a motor support member is attached to a section having said rotation-transmitted portion, and said large-sized motor is attached to a lower portion of said motor support member and extending into the interior space of said machine base.

5. A motor-driven injection molding machine according to claim 1, wherein in addition to said large-sized motors, relatively smaller-sized motors are accommodated in the interior space of said machine base to be located substantially at the center of said machine base with respect to the transverse direction thereof; and each of said rotation-transmitted portions provided in said injection apparatus and said mold clamping apparatus is drivingly connected to said corresponding smaller-sized motor via a rotation transmission mechanism comprising a rotation transmission belt.

6. A motor-driven injection molding machine according to claim 5, wherein said smaller-sized motors include a motor for injection apparatus reciprocation and a motor for ejection.

7. A motor-driven injection molding machine according to claim 5, wherein a motor support member is attached to a section having said rotation-transmitted portion, and said smaller-sized motor is attached to a lower portion of said motor support member and extending into the interior space of said machine base.

8. A motor-driven injection molding machine according to claim 1, wherein said rotation transmission mechanism further includes a drive pulley connected to a motor shaft of a servomotor and a driven pulley.

9. A motor-driven injection molding machine according to claim 8, wherein said rotation transmission belt winds around said drive pulley and said driven pulley to form a reciprocation drive section.

10. A motor-driven injection molding machine comprising:
- a machine base having an upper surface and a lower surface, said upper surface and said lower surface forming an interior space of said machine base;
- an injection apparatus and a mold clamping apparatus disposed on the upper surface of the machine base;
- a plurality of large-sized motors accommodated in the interior space of said machine base to be located substantially at a center of said machine base with respect to a transverse direction thereof; and each of rotation-transmitted portions provided in said injection apparatus and said mold clamping apparatus is drivingly connected to said corresponding large-sized motor via a rotation transmission mechanism comprising a rotation transmission belt; and
- a control unit disposed within said machine base and directly connected to at least one of said large-sized motors.

* * * * *